US00RE48927E

(19) United States
(12) Reissued Patent
Schmidt et al.

(10) Patent Number: US RE48,927 E
(45) Date of Reissued Patent: Feb. 8, 2022

(54) TERMINAL ASSEMBLY COMPRISING A FOAM SEALING MATERIAL, ELECTRICAL TERMINAL AND ELECTRICAL CONDUCTOR COMPRISING A FOAMABLE SEALING MATERIAL AS WELL AS A METHOD FOR SEALING THE CONNECTION BETWEEN AN ELECTRICAL WIRE AND AN ELECTRICAL TERMINAL

(71) Applicant: TE Connectivity Germany GmbH, Bensheim (DE)

(72) Inventors: Helge Schmidt, Speyer (DE); Maryam Haghighi, Frankfurt am Main (DE); Stefan Thoss, Worms (DE)

(73) Assignee: TE Connectivity Germany GmbH, Bensheim (DE)

(21) Appl. No.: 16/866,084

(22) Filed: May 4, 2020

Related U.S. Patent Documents

Reissue of:
(64) Patent No.: 10,530,071
Issued: Jan. 7, 2020
Appl. No.: 15/948,389
Filed: Apr. 9, 2018

U.S. Applications:
(63) Continuation of application No. PCT/EP2016/074112, filed on Oct. 7, 2016.

(30) Foreign Application Priority Data

Oct. 9, 2015 (DE) ..... 10 2015 219 654.2

(51) Int. Cl.
*H01R 4/70* (2006.01)
*H01R 4/18* (2006.01)
*H01R 13/52* (2006.01)

(52) U.S. Cl.
CPC ..... *H01R 4/70* (2013.01); *H01R 4/184* (2013.01); *H01R 13/5216* (2013.01); *H01R 13/5221* (2013.01)

(58) Field of Classification Search
None
See application file for complete search history.

(56) References Cited

U.S. PATENT DOCUMENTS 3,955,044 A 5/1976 Hoffman et al.
5,118,313 A * 6/1992 Delalle ..... H01R 4/72 439/730

(Continued)

FOREIGN PATENT DOCUMENTS

CN 101587848 A 11/2009
CN 101827911 A 9/2010

(Continued)

OTHER PUBLICATIONS

The Fourth Office Action, National Intellectual Property Administration of the People's Republic of China and English translation, dated Nov. 17, 2020, 8 pages.

(Continued)

*Primary Examiner* — Carlos N Lopez
(74) *Attorney, Agent, or Firm* — Barley Snyder

(57) ABSTRACT

A terminal assembly comprises a conductor and an electrical terminal having a connection area connected to the conductor. A seal of the terminal assembly seals the connection area in a fluid-tight manner. The seal is composed of a foamable sealing material which includes an activatable blowing agent.

20 Claims, 4 Drawing Sheets

(56) References Cited

U.S. PATENT DOCUMENTS

| | | | | |
|---|---|---|---|---|
| 7,390,845 | B2 * | 6/2008 | Lach, III | B29C 45/14311 523/437 |
| 7,976,750 | B2 * | 7/2011 | Burmeister | B29C 44/1266 264/46.5 |
| 8,247,465 | B2 | 8/2012 | Inohara et al. | |
| 8,771,015 | B2 * | 7/2014 | Inoue | H01R 4/70 439/604 |
| 9,378,867 | B2 * | 6/2016 | Itou | H01R 4/70 |
| 2005/0191882 | A1 | 9/2005 | Torii et al. | |
| 2010/0206631 | A1 | 8/2010 | Peters et al. | |
| 2013/0072074 | A1 | 3/2013 | Inoue et al. | |
| 2016/0137912 | A1 * | 5/2016 | Sherman | C09K 8/805 166/280.2 |

FOREIGN PATENT DOCUMENTS

| | | | |
|---|---|---|---|
| CN | 102822263 | A | 12/2012 |
| CN | 103004024 | A | 3/2013 |
| CN | 103329380 | A | 9/2013 |
| EP | 0037253 | A2 | 11/1981 |
| EP | 0351982 | A1 | 1/1990 |
| EP | 0701300 | A2 | 3/1996 |
| EP | 2508561 | A2 | 10/2012 |
| GB | 1468369 | | 2/1974 |
| JP | S57-42939 | B2 | 9/1982 |
| JP | 2005-261184 | A | 9/2005 |
| JP | 2012-28152 | A | 2/2012 |
| JP | 2014186989 | A | 10/2014 |

OTHER PUBLICATIONS

Chinese Second Office Action and English translation, dated Dec. 20, 2019, 25 pages.

European Patent Office Communication, dated Apr. 23, 2020, 6 pages.

Chinese Third Office Action and English translation, dated Jul. 3, 2020, 26 pages.

PCT Notification of Transmittal of the International Search Report and the Written Opinion of the International Searching Authority, or the Declaration, International Search Report and Written Opinion of the International Searching Authority, dated Nov. 21, 2016, 12 pages.

Japanese Notice for Reasons for Refusal with English translation, dated Jun. 4, 2019, 15 pages.

* cited by examiner

TERMINAL ASSEMBLY COMPRISING A FOAM SEALING MATERIAL, ELECTRICAL TERMINAL AND ELECTRICAL CONDUCTOR COMPRISING A FOAMABLE SEALING MATERIAL AS WELL AS A METHOD FOR SEALING THE CONNECTION BETWEEN AN ELECTRICAL WIRE AND AN ELECTRICAL TERMINAL

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application is a continuation of PCT International Application No. PCT/EP2016/074112, filed on Oct. 7, 2016, which claims priority under 35 U.S.C. § 119 to German Patent Application No. 102015219654.2, filed on Oct. 9, 2015.

FIELD OF THE INVENTION

The present invention relates to a terminal assembly and, more particularly, to a terminal assembly having a seal which seals a connection between a conductor and an electrical terminal of the terminal assembly.

BACKGROUND

Terminal assemblies including electrical terminals and electrical wires connected to the electrical terminals are used in plug connectors and cable trees. The cable trees and the terminals in plug connectors are often produced from copper or a copper alloy. However, copper is very heavy and is relatively expensive. Cable trees and plug connectors are increasingly being miniaturized, in the automotive industry for example, to save weight and cost. Alternative conductor materials which are lighter and cheaper than copper are therefore increasingly considered; conductors made from base metals—metals which, in the electrochemical series, have a standard electrode potential smaller than the standard electrode potential of hydrogen—are lighter and cheaper than copper. The base metal may be, for example, aluminum or an aluminum alloy.

However, when connecting conductors which comprise a base metal to a terminal which comprises copper or another noble metal, it is difficult to produce a reliable mechanical and electrical connection between the conductor and the terminals. A mechanical connection of a conductor and a terminal which are composed of different metals or metal alloys is problematic as the connection is relatively weak and plug connectors in the automotive sector, for example, are exposed to large physical stresses and must therefore withstand high forces. Further, the connection of a terminal which comprises copper or a more noble metal to a conductor which comprises a base metal such as aluminum, for example, is electrochemically problematic because the point of contact between the noble and less noble metals is in danger of corroding. Due to the differing dissolution potentials of the different metals, galvanic corrosion can occur if the connection area comes into contact with an electrolyte, water, or moisture. The less noble metal becomes the anode and the more noble metal becomes the cathode, which leads to the dissolution of the anode. Such a corrosion thus weakens the mechanical connection. The corrosion may also impair the charge transfer if an oxidation layer is formed in the event of corrosion.

To prevent corrosion between the different materials of the terminal and the conductor, it is common to use a lubricant or a holt-melt adhesive to create a fluid-tight seal around the connection area. Lubricants, however, must be applied before the terminal is mechanically and electrically conductively connected to the conductor in the connection area, which negatively affects the mechanical stability of the connection. The same applies to the use of hot-melt adhesives as sealing materials. Sealing after the conductor and the terminal are already mechanically and electrically conductively connected to one another is complex and difficult to accomplish because the connection area can only be accessed with difficulty after connection, for example when it is inside a crimping sleeve. Conversely, the use of special seals is generally expensive and requires complex structural changes to the components of a terminal assembly in order to provide the seals with suitable sealing sites.

SUMMARY

A terminal assembly comprises a conductor and an electrical terminal having a connection area connected to the conductor. A seal of the terminal assembly seals the connection area in a fluid-tight manner. The seal is composed of a foamable sealing material which includes an activatable blowing agent.

BRIEF DESCRIPTION OF THE DRAWINGS

The invention will now be described by way of example with reference to the accompanying Figures, of which.

DETAILED DESCRIPTION OF THE EMBODIMENT(S)

Figure 2A:
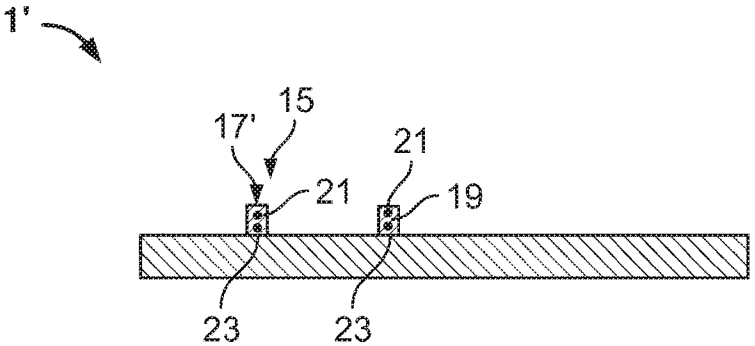
FIG. 2A is a sectional view of an electrical terminal according to another embodiment.

Exemplary embodiments of the present invention will be described hereinafter in detail with reference to the attached drawings, wherein like reference numerals refer to like elements. The present invention may, however, be embodied in many different forms and should not be construed as being limited to the embodiments set forth herein. Rather, these embodiments are provided so that the present disclosure will be thorough and complete and will fully convey the concept of the disclosure to those skilled in the art.

Figure 1A:
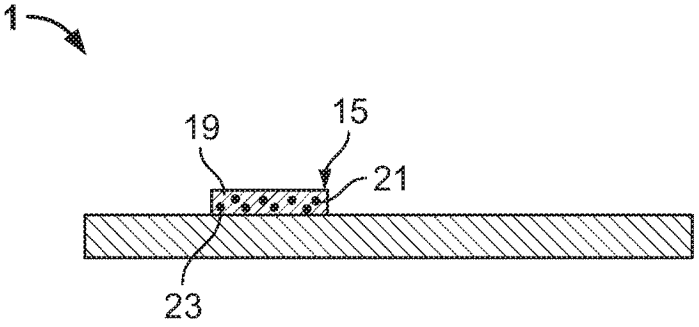
FIG. 1A is a sectional view of an electrical terminal according to an embodiment.
Figure 1B:
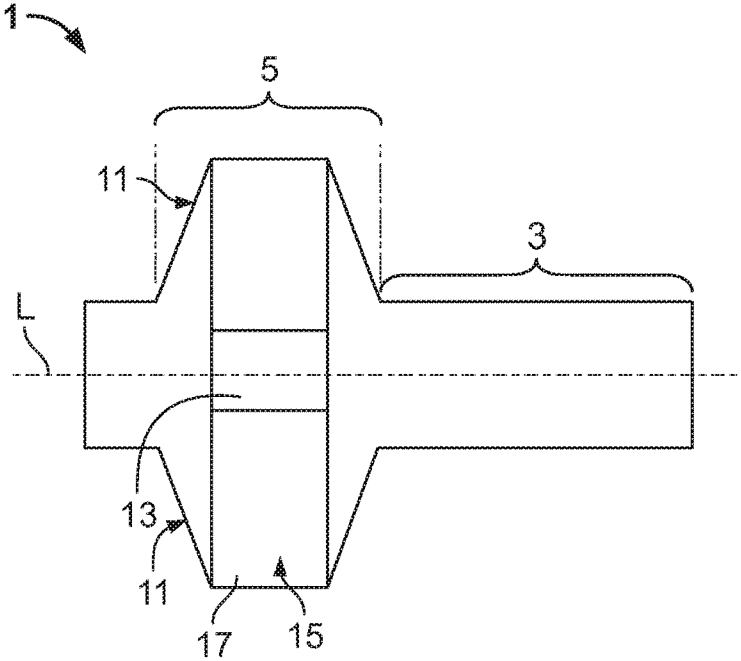
FIG. 1B is a plan view of the electrical terminal of FIG. 1A.

An electrical terminal 1 according to an embodiment is shown in FIGS. 1A and 1B. The terminal 1 comprises a contact area 3 and a connection region 5. The contact area 3 is an area with which the terminal 1 electrically contacts a mating plug element (not shown), for example a part of a mating electrical plug connector (not shown). The terminal 1 is connected to a conductor 7 of a wire 9 at the connection region 5.

As shown in FIG. 1B, the connection region 5 includes two crimping wings 11 which are disposed opposite one another about a longitudinal axis L. The crimping wings 11 are folded radially around relative to the longitudinal axis L in order to connect the conductor 7 to the terminal 1 in a mechanical and electrically conductive manner in a connection area 13 of the terminal 1. The connection area 13 is a section of the connection region 5 in which the connection is produced between terminal 1 and conductor 7 of the electrical wire 9. In an embodiment, in order to improve the mechanical and/or electrically conductive connection, the connection area 13 can be provided with grooves in order to improve the roughness of the surface.

The terminal 1 comprises a seal 15. In the embodiment of FIGS. 1A and 1B, the seal 15 is in the form of a sealing film 17 disposed on the surface of the terminal 1. The sealing film 17 extends transverse to the longitudinal axis L over the entire width of the terminal 1 in the part of the connection region 5 which comprises the connection area 13. In the embodiment shown, the sealing film 17 covers almost the entire crimping wings 11. The seal 15 or sealing film 17 includes a foamable sealing material 19 which has an activatable blowing agent 21 distributed uniformly in the sealing material 19. The activatable blowing agent 21 is depicted by way of example in the form of small beads in FIG. 1A.

In the embodiment shown in FIGS. 1A and 1B, the seal 15 is depicted merely by way of example as the sealing film 17 which covers the terminal 1 in the region of the crimping wings 11, substantially covering the connection area 13 virtually over its complete width transverse to the longitudinal direction L. In other embodiments, only the connection area 13 is covered with the sealing film 17 or the sealing film 17 may be disposed on the connection area 13 in another manner, for example, with a first part of the sealing film 17 covering the connection area 13 and a second part of the sealing film 17 arranged alongside the connection area 13. The sealing film 17 may be disposed in the connection region 5 in any manner provided the connection area 13 is sealed in a corrosion-resistant, i.e. fluid-tight, manner once the terminal 1 is connected to the conductor 7 in the connection area 13 and the blowing agent 21 is activated to foam the sealing material 19.

Figure 2B:
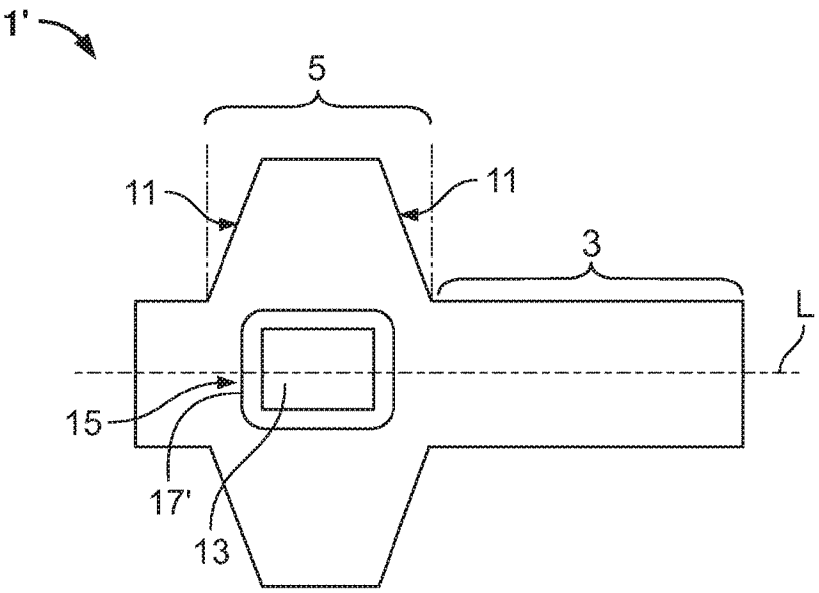
FIG. 2B is a plan view of the electrical terminal of FIG. 2A.

An electrical terminal 1' according to another embodiment is shown in FIGS. 2A and 2B. Like reference numbers refer to like elements and only the differences from the embodiment shown in FIGS. 1A and 1B will be described in detail herein. The electrical terminal 1' includes the foamable sealing material 19 formed as a sealing ring 17', as shown in FIGS. 2A and 2B. The sealing ring, 17' completely surrounds the connection area 13.

In an embodiment, the foamable sealing material 19 is a thermoplastic, for example, a thermoplastic elastomer. Thermoplasts are deformed in a particular temperature range and thermoplastic elastomers are plastics which are dimensionally stable and elastically deformable at room temperature, and which plastically deform under the application of heat. The thermoplastic properties of the sealing material 19 make it possible to form the sealing 19 material easily into the shape desired, for example as a film 17, ring 17', clip or sleeve, which facilitates assignment to the connection area 13. In an embodiment, the sealing material 19 is a polyolefin such as polyethylene, polypropylene or polyamides. In another embodiment, the sealing material 19 is a copolymer, for example, a copolymer comprising a vinyl acetate such as ethylene vinyl acetate, and a methyl acrylate such as ethylene methyl acrylate.

The sealing material 19, as shown in FIGS. 1A and 2A, has an adhesive agent 23 in order to fix the seal 15, for example the sealing film 17 of FIGS. 1A and 1B or the sealing ring 17' of FIGS. 2A and 2B, at the desired position in the connection area 13. In an embodiment, the adhesive agent 23 is only arranged at the interface between the surface of the terminal 1 and the seal 15 and, for example, is a glue. In other embodiments, the adhesive agent 23 is integrated into the sealing material 19. For example, a sticky resin can be admixed to the sealing material 19 so that the sealing material 19, and consequently the seal 15, has adhesive properties overall. In an embodiment, the adhesive agent 23 may be a resin, for example, an aromatic thermoplastic resins or a partially polymerised resin. In an embodiment in which the foamable sealing material 19 is mixed with the adhesive agent 23, a foamed sealing material 19a produced by foaming in the foamable sealing material 19 then also has adhesive properties and not only forms fluid-tight sealing, as described in greater detail below, but also adheres the conductor 7 to the terminal 1.

Figure 3:
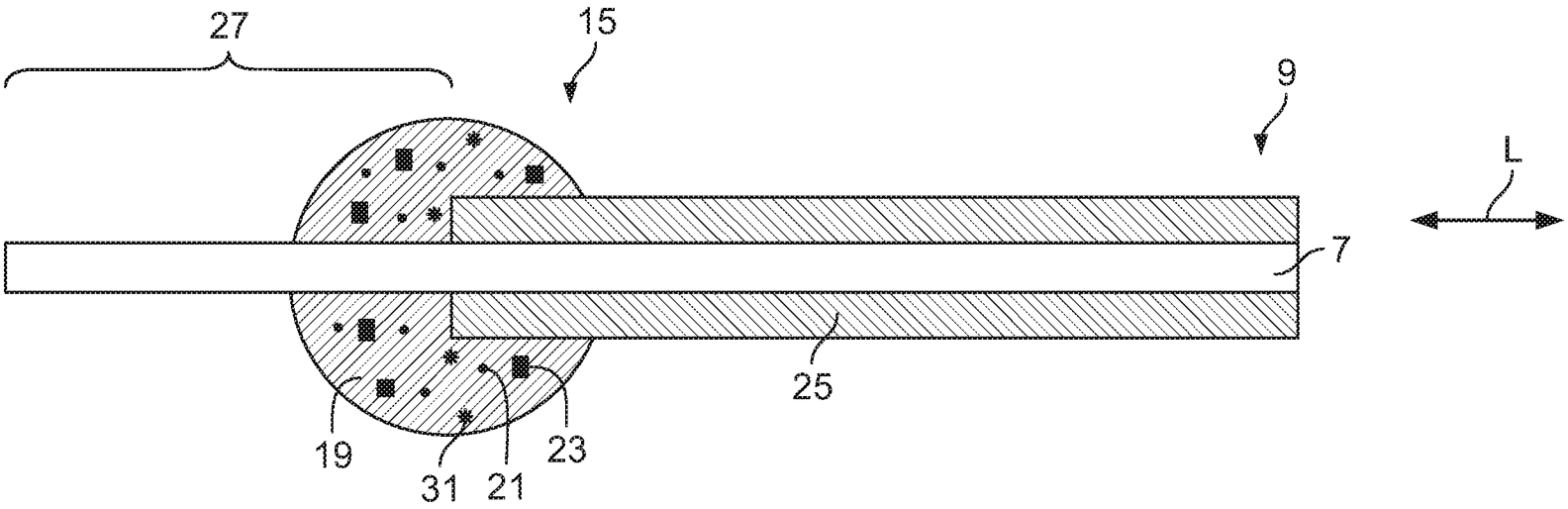
FIG. 3 is a sectional view of an electrical wire according to an embodiment.
Figure 4:
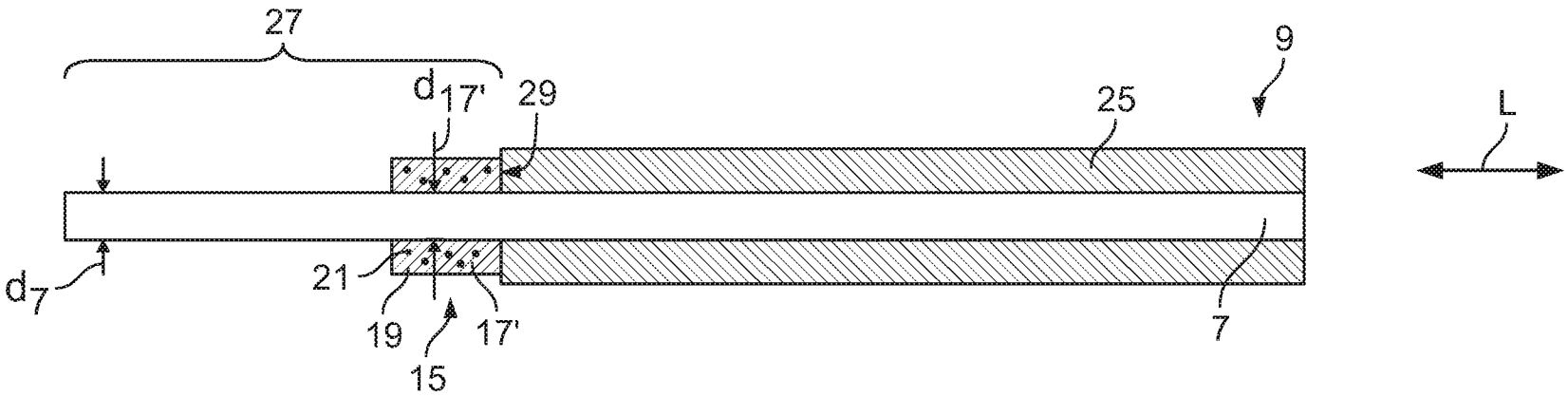
FIG. 4 is a sectional view of an electrical wire according to another embodiment.

An electrical wire 9 according to various embodiments is shown in FIGS. 3 and 4. The electrical wire 9 includes the conductor 7 arranged in an insulating cover 25. A connection section 27 of the electrical wire 9 is connected to the electrical terminal 1, 1' in a mechanical and an electrically conductive manner. In the embodiment shown, the insulating cover 25 is removed in the connection section 27 and the conductor 7 is exposed in the connection section 27. The seal 15 is disposed at the connection section 27 of the electrical wire 9.

The conductor 7 comprises aluminum or an aluminum alloy and, in an embodiment, consists of aluminum or an electrically conductive aluminum alloy. In various embodiments, the conductor 7 has a conductor cross-sectional area of 0.1 to 3 $mm^2$, 0.2 to 1.5 $mm^2$, or 0.22 to 1 $mm^2$. In an embodiment, the terminal 1 is made of a more noble metal than the conductor 7 and may comprise copper or a copper alloy.

In the embodiment shown in FIG. 3, the seal 15 is arranged at a portion in the connection section 27, i.e. at the exposed conductor 7, and at a portion of the cover 25 which delimits the connection area 27 in the direction of longitudinal axis L. In the embodiment of FIG. 3, the seal 15 is configured for example as a sphere and the spherical seal 15 is pushed onto the electrical wire 9 in the longitudinal direction L from an exposed end of the conductor 7. The seal 15 may be plastically deformable, for example can have a doughy consistency, at the time at which the seal 15 is placed on the electrical wire 9.

The foamable sealing material 19 of FIG. 3 further comprises a cross-linking agent 31. The cross-linking agent 31 is uniformly distributed in the sealing material 19 and, if it is activated, cures the sealing material 19. The sealing material 19 hardens when cured. The cross-linking agent 31 may be activated by an external influence such as the addition of a starting reagent, a radiation, a change in temperature, or a change in pressure. The cross-linking agent 31 may be a peroxide compound, such as butyl hydroperoxide (e.g. Luperox TBH), or an organic peroxide (such as Varox 130X).

In the embodiment of the electrical wire 9 shown in FIG. 4, the elastic sealing ring 17' is used as the seal 15. The sealing ring 17' is threaded over the exposed conductor 7 in the connection section 27 and, in the longitudinal axis direction L, abuts against an end face 29 of the insulating cover 25 which borders the connection section 27. In the seal 15 of the embodiment shown in FIG. 4, the sealing material 19 contains no adhesive agent 23. The sealing material 19 is composed of an elastomeric plastic which, due to its elastic deformability, can be arranged at the desired location and be fixed at this location. An external diameter d7 or the outer dimensions of the conductor 7, depending on whether the conductor cross-section is round, oval or polygonal or free-formed, is larger than an inner width d17' of the sealing ring 17' in the initial state. In the state shown in FIG. 4, the inner width d17' is widened such that the sealing ring 17' can be slipped onto the conductor 7, and the elasticity of the elastomeric sealing material 19 presses the sealing ring 17' onto the conductor 7.

Figure 5A:
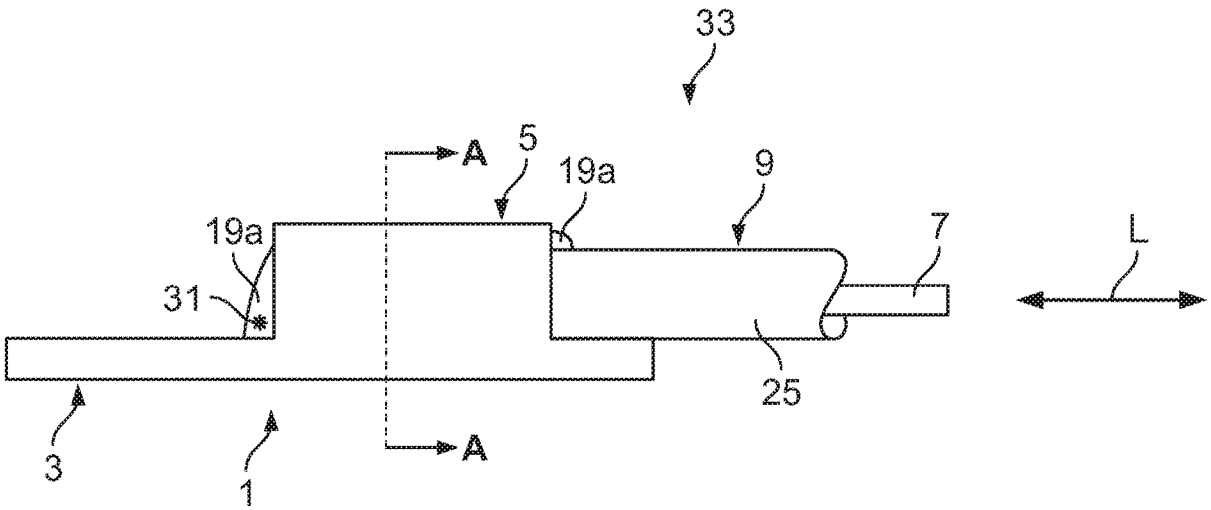
FIG. 5A is a side view of a terminal assembly according to an embodiment.
Figure 5B:
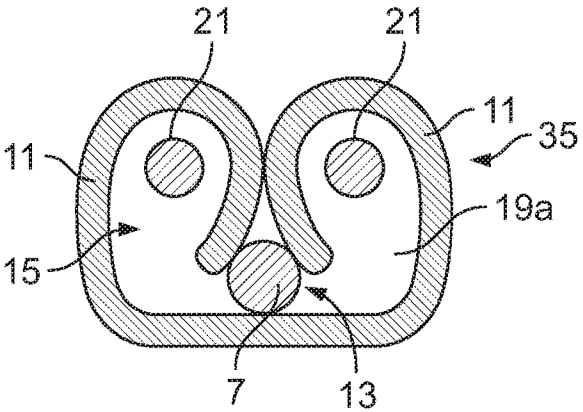
FIG. 5B is a sectional view of the terminal assembly of FIG. 5A taken along line A-A of FIG. 5A.

A terminal assembly 33 according to an embodiment is shown in FIGS. 5A and 5B. The terminal assembly 33 comprises the terminal 1 and the conductor 7. The conductor 7 is connected to the terminal 1 at the connection area 13 and the seal 15 seals the connection area 13 in a fluid-tight manlier.

The foamable sealing material 19 is foamed by the activatable blowing agent 21 into the foamed sealing material 19a, as described below with reference to FIGS. 6A and 6B, in the terminal assembly 33. The foamed sealing material 19a completely fills a crimping sleeve 35, which is formed by the folded-around crimping wings 11 and in the interior of which is situated a connection seam between the connection area 13 and the connection section 27 of the conductor 7. The foamed sealing material 19a, as shown in FIGS. 5A and 5B, even spills out at the ends of the crimping sleeve 35 along longitudinal axis L. The foamed sealing material 19a thus seals the connection between the conductor 7 and the connection area 13 of the terminal 1 in a fluid-tight manner to avoid corrosion at the joint between the conductor 7 and the connection area 13.

The blowing agent 21 is activated to foam the foamable sealing material 19 and transform it into the foamed sealing material 19a. The blowing agent 21 can be activated, for example, by an increase in temperature; as soon as the temperature exceeds an activation temperature of the blowing agent 21, the blowing agent 21 expands, whereby the sealing material 19 is foamed, its volume is increased as a result, and it fills the free spaces in the connection area, for example the complete crimping sleeve 35. In other embodiments, the blowing agent 21 may be activated by the addition of a reactant, a change in pressure, or the application of radiation.

A melting point of the sealing material 19 is below the activation temperature of the blowing agent 21; the sealing material 19 can be thermoplastically deformable below the activation temperature. As a result, seals 15 in any desired form, for example films, rings or inserts, can be produced from the sealing material 19 using standard methods in plastics technology, without the blowing agent 21 being activated. The sealing material 19 can undergo primary molding below the activation temperature of the blowing agent 21. Primary molding includes manufacturing methods in which a solid body is produced from an amorphous substance. The amorphous substance can for example be a plastic or doughy state, such as a polymer melt, which can be formed into the desired shape for example by means of injection molding, extrusion blow molding or extrusion. The activation temperature is below the decomposition temperature of the sealing material 19 in order to preclude decomposition of the sealing material 19 in the event of activation. In an embodiment, the melting point of the sealing material 19 is below 170° C. and the sealing material 19 is capable of undergoing primary molding in a range between 90° C. and 170° C., or between 130° C. and 170° C. In an embodiment, the activation temperature is 180° C. to 210° C.

In an embodiment in which the cross-linking agent 31 is temperature-activated, the cross-linking temperature is above the melting point of the sealing material 19 and is at least as high as an activation temperature of the blowing agent 21. It is thus ensured that the sealing material 19 is not yet cross-linked while it is thermoplastic and capable of undergoing primary moulding and that the activation of the cross-linking agent 31 only occurs once the sealing material 19 is foamed.

Figure 6B:
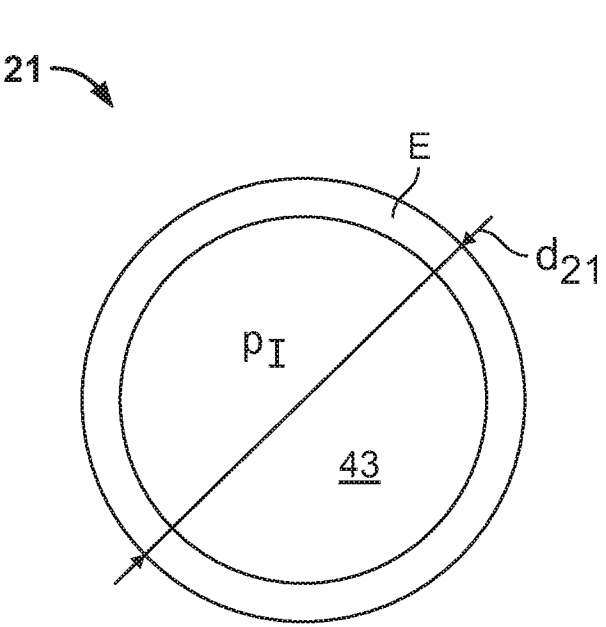
FIG. 6B is a sectional view of the blowing agent after activation.
Figure 6A:
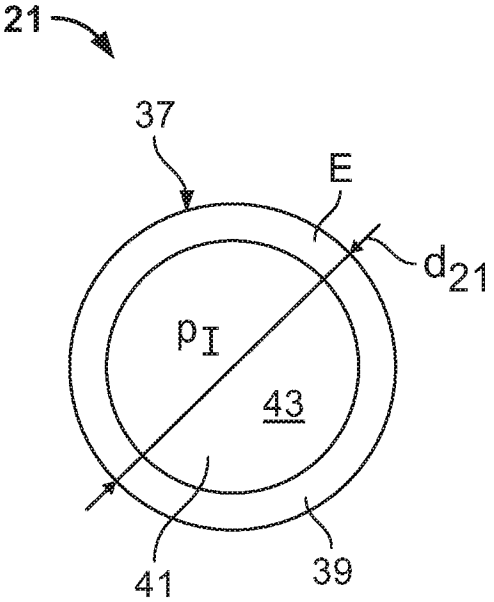
FIG. 6A is a sectional view of a blowing agent prior to activation.

An exemplary blowing agent 21 is schematically shown in FIGS. 6A and 6B. FIG. 6A shows the blowing agent 21 prior to its activation and FIG. 6B shows the blowing agent after its activation.

The blowing agent 21 shown in FIGS. 6A and 6B comprises stretchable capsules 37. The capsules 37 comprise a casing 39 which, for example, is composed of a stretchable plastic. In an embodiment, the casing 39 is made of a polymer, for example an elastomer, such as an acrylonitrile-based copolymer. A capsule interior 41 is filled with an expandable substance 43, for example, a fluid which expands when the activation temperature is reached and exceeded. The expansion substance 43 may be a fluid such as fluid isopentane or isobutene.

When the activation temperature is exceeded, the expansion of the expansion substance 43 causes an increase in the internal pressure pI in the interior of the capsule 37, which expands due to the increasing internal pressure pI as shown in FIG. 6B. Due to the expansion, the external diameter d21 of the capsule 37 grows larger, which leads to a foaming of the sealing compound 19. In an embodiment, the stretchable capsules 37 can have a diameter of approximately 5 μm prior to activation and expand to a diameter of approximately 10 μm after activation. By suitably selecting the modulus of elasticity E of the material of the casing 39 and selecting the expandable substance 43, in particular its internal pressure pI generated upon activation, the extent by which the external diameter d21 of the capsules 37 is enlarged upon activation is controlled in a targeted manner and matched to the requirements of the sealing material 19. The encapsulation materials of the capsules 37 can also be sufficiently heat-resistant to remain intact and preclude egress of the expandable substance 43 when an activation temperature is reached.

In an exemplary method, in order to create the seal 15 at the terminal 1 and apply the sealing material 19, the sealing material 19 is first heated to approx. 170° C. using a heating device. The sealing material 19 comprises a plurality of microballoons which are plastically deformable at this temperature; the balloons are then pressed together in order to produce as thin a film 17 as possible therefrom. This film 17 is laid into the open crimp in the connection region 5 prior to the crimping process. Alternatively, small rings 17' can be produced from the thin film. These are then slipped onto the isolated wire 9 into the connection region 5.

The seal 15 is thus located in the connection area 13 before the terminal 1 and the conductor 7 are crimped together. In this manner, the sealing material 19 is reliably arranged in or in sufficient proximity to the connection area 13, such that even a slight expansion and foaming of the sealing material 19 with a volume increase of, for example, at least 50%, is sufficient to accomplish a corrosion-resistant sealing of the connection area 13. After crimping, parts of the terminal assembly 33 are heated to over 200° C. in order to activate the blowing agent 21, which then presses the sealing material 19 into the free spaces and seals the connection area 13.

What is claimed is:

1. A terminal assembly, comprising:

a conductor; and an electrical terminal having a connection area connected to the conductor and a seal that seals the connection area in a fluid-tight manner, the seal is composed of a foamable sealing material which includes an activatable blowing agent, the blowing agent is temperature-activatable and expands when an activation temperature is exceeded, the sealing material is a thermoplastic and a melting point of the sealing material is below the activation temperature of the blowing agent.

2. The terminal assembly of claim 1, wherein the blowing agent comprises a plurality of stretchable capsules each filled with an expandable substance.

3. The terminal assembly of claim 1, wherein the sealing material is capable of undergoing primary molding below the activation temperature of the blowing agent.

4. The terminal assembly of claim 1, wherein the sealing material includes a cross-linking agent.

5. The terminal assembly of claim 1, wherein the sealing material includes an adhesive agent.

6. An electrical terminal, comprising:

a connection area connecting to a conductor; and a seal disposed at the connection area and composed of a foamable sealing material which includes an activatable blowing agent, the blowing agent is temperature-activatable and expands when an activation temperature is exceeded, the sealing material is a thermoplastic and a melting point of the sealing material is below the activation temperature of the blowing agent.

7. The electrical terminal of claim 6, wherein the connection area is covered at least in part by the sealing material.

8. An electrical wire, comprising:

an insulating cover; and a conductor disposed in the insulating cover and having a connection section connecting to an electrical terminal, a seal composed of a foamable sealing material which includes an activatable blowing agent is disposed at the connection section, the blowing agent is temperature-activatable and expands when an activation temperature is exceeded, the sealing material is a thermoplastic and a melting point of the sealing material is below the activation temperature of the blowing agent.

9. The electrical wire of claim 8, wherein the seal is an elastic sealing ring disposed only over a portion of the conductor exposed in the connection section.

10. The electrical wire of claim 8, wherein the seal radially surrounds at least a portion of the insulating cover.

11. The electrical wire of claim 10, wherein the insulating cover is removed from the conductor in the connection section and the conductor is exposed in the connection section.

12. The electrical wire of claim 11, wherein the seal is arranged both in the connection section and at a portion of the insulating cover delimiting the connection section.

13. A method for sealing a connection between a conductor and a terminal, comprising:

providing the conductor arranged in an insulating cover;

connecting a connection section of the conductor to a connection area of the terminal;

disposing a seal made of a foamable sealing material which includes an activatable blowing agent at the connection area and/or at the connection section;

activating the blowing agent and foaming the sealing material by activation of the blowing agent to produce a foamed sealing material, the blowing agent is temperature-activatable and expands when an activation temperature is exceeded, the sealing material is a thermoplastic and a melting point of the sealing material is below the activation temperature of the blowing agent; and sealing the connection with the foamed sealing material in a fluid-tight manner.

14. The method of claim 13, wherein, before connecting the connection section of the conductor to the connection area of the terminal, and during the disposing step, the connection area of the terminal is at least partially covered with the sealing material.

15. The method of claim 13, wherein, before connecting the connection section of the conductor to the connection area of the terminal, and during the disposing step, at least a portion of the insulating cover is covered radially by the sealing material.

16. A sealing material for sealing a connection of a conductor to a connection area of an electrical terminal, comprising:

a foamable sealing material including an activatable blowing agent distributed in the foamable sealing material and capable of foaming the foamable sealing material into a foamed sealing material upon activation, the activatable blowing agent is temperature-activatable and expands when an activation temperature is exceeded, the foamable sealing material is a thermoplastic and a melting point of the foamable sealing material is below the activation temperature of the activatable blowing agent.

17. The sealing material of claim 16, wherein the foamable sealing material includes a cross-linking agent having a cross-linking temperature greater than or equal to the activation temperature of the activatable blowing agent.

*18. The electrical terminal of claim 6, wherein the sealing material is a polyolefin or a copolymer.*

*19. The electrical terminal of claim 6, wherein the sealing material includes a cross-linking agent having a cross-linking temperature greater than or equal to the activation temperature of the blowing agent.*

*20. The sealing material of claim 16, further comprising an adhesive agent integrated into the sealing material.*

* * * * *